(12) United States Patent
Chakravarty (10) Patent No.: US 8,090,965 B1
(45) Date of Patent: Jan. 3, 2012

(54) SYSTEM AND METHOD FOR TESTING MEMORY POWER MANAGEMENT MODES IN AN INTEGRATED CIRCUIT

(75) Inventor: Sreejit Chakravarty, Mountain View, CA (US)

(73) Assignee: LSI Corporation, Milpitas, CA (US)

( * ) Notice: Subject to any disclaimer, the term of this patent is extended or adjusted under 35 U.S.C. 154(b) by 634 days.

(21) Appl. No.: 12/104,996

(22) Filed: Apr. 17, 2008

(51) Int. Cl.
 *G06F 1/00* (2006.01)
 *G06F 1/26* (2006.01)
 *G06F 1/32* (2006.01)
 *G06F 11/00* (2006.01)

(52) U.S. Cl. ........ 713/300; 713/320; 713/323; 713/330; 714/14; 714/25; 714/36

(58) Field of Classification Search ........... 713/300, 713/310, 320, 321, 322, 323, 324, 340, 375; 714/14, 25
See application file for complete search history.

(56) References Cited

U.S. PATENT DOCUMENTS

| 6,182,257 B1* | 1/2001 | Gillingham | 714/733 |
| 6,675,330 B1* | 1/2004 | Levy-Kendler et al. | 714/724 |
| 2008/0091989 A1* | 4/2008 | Bakhshi et al. | 714/718 |
| 2008/0195875 A1* | 8/2008 | Hobson | 713/320 |

* cited by examiner

*Primary Examiner* — Chun Cao
*Assistant Examiner* — Samantha Hoang (57) ABSTRACT

A memory controller, a method of testing memory power management modes in an integrated circuit and an integrated circuit. In one embodiment, the memory controller includes a power management mode test controller couplable to a test access port and at least one memory core and configured to respond to a signal provided via the test access port by providing an ordered signal-setting sequence to the at least one memory core to cause the at least one memory core to enter into and exit from at least one memory power management mode.

23 Claims, 10 Drawing Sheets

PRIOR ART

SYSTEM AND METHOD FOR TESTING MEMORY POWER MANAGEMENT MODES IN AN INTEGRATED CIRCUIT

TECHNICAL FIELD

The invention is directed, in general, to integrated circuit (IC) testing using a test access port and, more specifically, to a system and method for testing memory power management modes in an IC.

BACKGROUND

Small, low-power integrated circuits (ICs), such as application-specific ICs (ASICs) and application-specific standard products (ASSPs), are finding ever-increasing application in a wide variety of battery-powered, mobile devices. This is likely to continue and accelerate. Not only have these ICs begun to employ embedded memories, those memories are occupying an ever-increasing percentage of the total area of the IC. Embedded memories, including static random access memories (SRAM), consume power even when they are inactive.

Modern memories are equipped with one or more memory power management modes (e.g., standby, retention and power down modes) to reduce the power they consume while they are inactive. Memories are placed in a low-power mode until needed again. While in a low-power mode, they consume considerably less power and can significantly increase the duration of a battery charge.

ICs should be tested following manufacture to ensure their proper operation. For this reason, ICs are typically provided with a test access port (TAP) that conforms to Institute of Electrical and Electronics Engineers, Inc., (IEEE) 1149.1, or Joint Test Access Group (JTAG), standard. JTAG specifies a "boundary scanning" technique in which a tester (also called automated test equipment, or ATE) connected to the TAP via a JTAG (serial) bus provides one or more patterns of zeroes and ones (a "test pattern") to the IC and receives a resulting ("output") pattern of responses by the IC to the test pattern. An output pattern that does not match expectations indicates a failed test. The output pattern may be analyzed to determine the nature of the IC failure and perhaps where in the IC the failure occurred.

Manufacturing testing should extend to the one or more low-power modes that IC memories may be able to attain. Unfortunately, testing memory power management modes involves strict timing, which JTAG's limited bandwidth may not be able to maintain as memory sizes expand and speeds increase. What is needed in the art is a better way of testing memory power management modes in an IC.

SUMMARY

To address the above-discussed deficiencies of the prior art, one aspect of the invention provides a memory controller. In one embodiment, the memory controller includes a power management mode test controller couplable to a TAP and at least one memory core and configured to respond to a signal provided via the TAP by providing an ordered signal-setting sequence to the at least one memory core to cause the at least one memory core to enter into and exit from at least one memory power management mode.

Another aspect of the invention provides a method of testing memory power management modes in an IC. In one embodiment, the method includes: (1) providing a signal to a power management mode test controller via a TAP and (2) providing, with the power management mode test controller, an ordered signal-setting sequence to the at least one memory core to cause the at least one memory core to enter into and exit from at least one memory power management mode.

Yet another aspect of the invention provides an IC. In one embodiment, the IC includes: (1) functional logic, (2) a TAP coupled to the functional logic and (3) memory coupled to the functional logic and the TAP and including at least one memory core and a memory controller coupled thereto, the memory controller having a power management mode test controller configured to respond to a signal provided via the TAP by providing an ordered signal-setting sequence to the at least one memory core to cause the at least one memory core to enter into and exit from at least a retention mode and a power down mode.

The foregoing has outlined certain aspects and embodiments of the invention so that those skilled in the pertinent art may better understand the detailed description of the invention that follows. Additional aspects and embodiments will be described hereinafter that form the subject of the claims of the invention. Those skilled in the pertinent art should appreciate that they can readily use the disclosed aspects and embodiments as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION OF CERTAIN ASPECTS AND EMBODIMENTS

1. Introduction

Figure 1A:
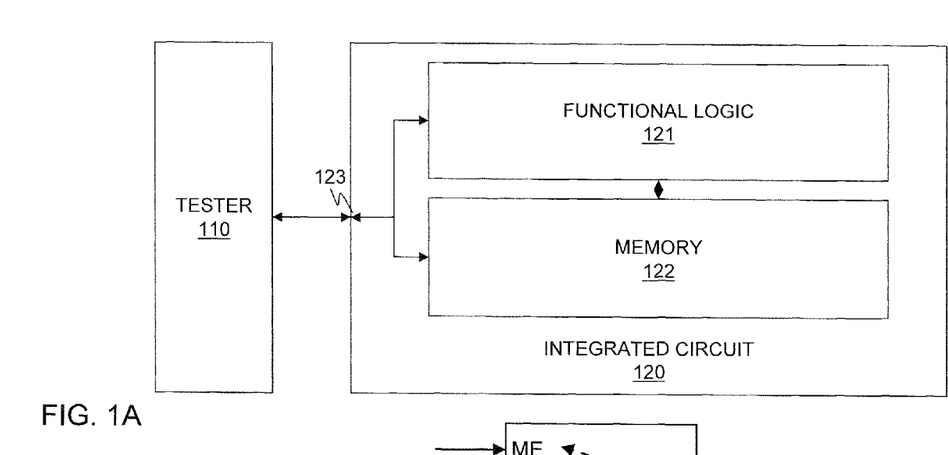
FIG. 1A is a high-level block diagram of one embodiment of an IC and a tester configured to perform tests on the IC.

FIG. 1A is a high-level block diagram of one embodiment of an IC 120 and a tester 110 (e.g., ATE) configured to perform tests on the IC 120. The IC 120 has functional logic 121, which may include a processor, combinatorial logic, a programmable logic array (PLA) or any other digital or analog circuitry that may be appropriate for a particular ASIC or ASSP. The IC 120 further has memory 122 coupled to the functional logic 121. The memory 122 includes a memory controller and one or more memory cores (not shown in FIG. 1A) that contain arrays of memory cells; each cell typically contains one bit of data. The memory 122 is typically responsible for storing one or both of instructions and data for use by the functional logic 121. The memory 122 may be of any physical type, capacity, width or configuration. For example, in one embodiment, the memory 122 is made up of complementary metal oxide semiconductor (CMOS) static random access memory (SRAM) cores. The memory 122 is capable of operating in at least one memory power management mode in which its power consumption is reduced relative to its active mode when data is being read from or written to the memory 122. The memory controller (not shown in FIG. 1A) controls entries to and exits from the memory power management modes.

The IC 120 further has a TAP 123 coupled to the functional logic 121 and the memory 122. The TAP 123 may comply with any conventional or later-developed standard. In the embodiment of FIG. 1A, the TAP 123 complies with the JTAG standard. Accordingly, the tester 110 couples via a JTAG bus to the TAP 123 and thereby to the functional logic 121 and the memory 122.

In various embodiments to be illustrated and described, a specialized controller, hereinafter called a power management mode test controller, is associated with, e.g., located within, the memory controller. The power management mode test controller is responsible for testing the memory in response to test patterns provided by the tester. In certain embodiments to be illustrated and described herein, the power management mode test controller:

fully tests the specs for entry and exit from the low power modes. More specifically, certain of the embodiments ensure that the memory remains in some intermediate states for no more than one clock cycle;

efficiently monitors the memory outputs during the low power modes;

either provides a preset duration or an adjustable duration for low power modes;

allows testing of a low power mode with or without its clock; and allows the number of global wires to be reduced.

Various embodiments of the system and method described herein provide:

a power management mode test controller that is included in the IC to facilitate diagnosis; and diagnostic techniques that use the power management mode test controller for diagnosis.

Certain embodiments allow a greater degree of diagnosis resolution than the prior art, determining not only that a memory has failed, but pinpointing a particular memory core within the memory that has failed. Other embodiments are capable of identifying multiple failing memory cores, perhaps spanning multiple memories. The power management mode test controller may take the form of a state machine capable of transitioning among a plurality of states depending upon signals provided to the controller.

2. Memory Power Management Modes

Figure 1B:
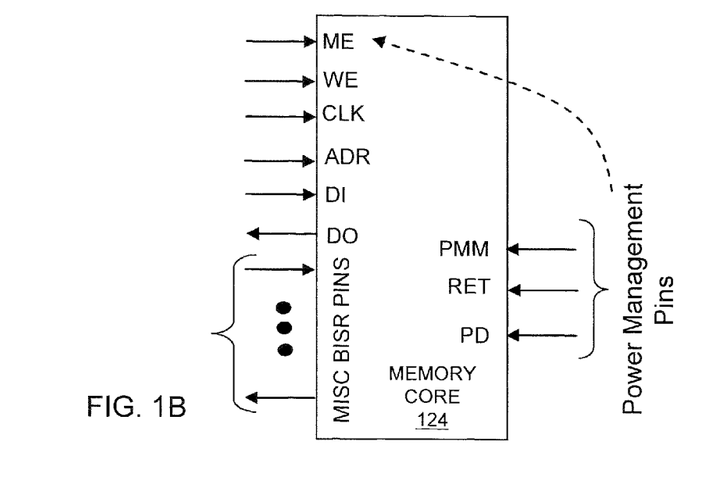
FIG. 1B is a block diagram of one embodiment of a memory core that may form at least part of the memory of the IC of FIG. 1A.

FIG. 1B is a block diagram of one embodiment of a memory core 124 that may form at least part of the memory 122 of the IC 120 of FIG. 1A. FIG. 1B is presented primarily for the purpose of providing an example of a memory core having at least one low power mode. FIG. 1B shows pins of interest for a one-port memory. In addition to the functional pins, such as memory enable (ME), write enable (WE), internal clock (CLK), address (ADR), data in (DI) and data out (DO), the memory could have additional built-in self-repair (BISR) pins that are driven by a BISR controller (not shown).

Additional pins, power management mode (PMM), retention (RET) and power down (PD), are provided for power management. These pins, along with ME, may be used as described below. Three power management modes are available in the memory core of FIG. 1B: (i) stand-by, (ii) retention and (iii) power down mode.

In the stand-by mode, the internal (memory) clock is turned off. ME is set to 0, and PMM, RET, PD are set to 0. Turning off the internal clock eliminates dynamic power consumption. However, leakage currents continue to consume power. The stand-by mode was adequate by itself for older memory technologies where the leakage current component of overall power consumption was relatively low. In this example, the stand-by mode is not tested. Instead, the focus is on testing the other two modes of power management operation: the retention mode and the power down mode.

In the retention mode, dynamic power is completely eliminated by switching off the internal clock. In addition leakage power is reduced by turning off the power supply to the peripheral logic, such as address decoders. In the retention mode, the content of the memory is guaranteed to be retained once it exits from of the retention mode. To accomplish this while reducing leakage power, the supply voltage to the cells and the repair registers is reduced as far as possible. Thus, the total power consumption in the retention mode is substantially lower than the standby mode.

Figure 2:
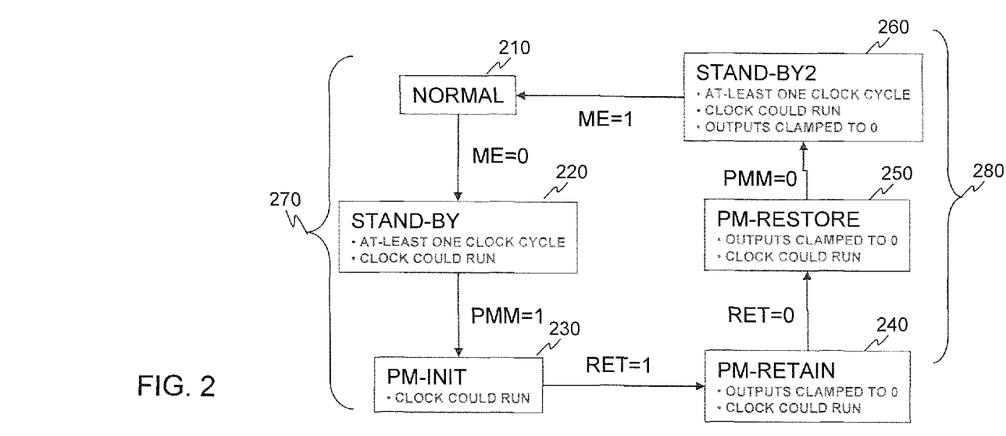
FIG. 2 is a state diagram describing states achieved and transitions encountered in entering and exiting one embodiment of a retention mode of the memory core of FIG. 1B.

FIG. 2 is a state diagram describing states achieved and transitions encountered in entering and exiting one embodiment of a retention mode of the memory core 124 of FIG. 1B. ME, PMM and RET are manipulated as described in FIG. 2 to cause the memory core 124 to enter and exit from the retention mode. The states are a NORMAL state 210, a STAND-BY state 220, a PM-INIT state 230, a PM-RETAIN state 240, a PM-RESTORE state 250 and a STAND-BY2 state 260. The NORMAL state 210 exists when the memory core 124 is being used to read and write data. The memory core 124 makes a transition to the STAND-BY state 220 when ME equals 0. As shown, the memory core 124 is required to be in the STAND-BY state 220 for at-least one clock cycle. In the STAND-BY state 220, the external memory clock can be on or off.

If PMM is set to 1 in the STAND-BY state 220, the memory core 124 makes a transition to the PM_INIT state 230. If RET is thereafter set to 1 a subsequent clock cycle, the memory core 124 enters the PM-RETAIN state 240. While in the PM-INIT and PM-RETAIN states 230, 240, the external memory clock can be on or off. Entry into the retention mode is now complete. The output of the memory core 124 is held at 0. The time taken to enter the PM-RETAIN state 240 from the NORMAL state 210 is referred to herein as "entry latency," symbolized in FIG. 2 by a left-hand brace 270. The PMM and RET signals are asynchronous signals. However, if a synchronous system changes the PMM and RET signals during a functional mode, the minimum entry latency is four functional clock cycles.

The memory core 124 may be kept in the PM-RETAIN state 240 indefinitely, but a sequence of state transitions must be undertaken if an exit from the PM-RETAIN state 240 back to the NORMAL state 210 is desired. To exit the PM-RETAIN state 240, RET is first set to 0, causing the memory core 124 to transition to the PM-RESTORE state 250. Then, PMM is set to 0, causing the memory core 124 to transition to the STAND-BY2 state 260. Finally, ME is set to 1, causing the memory core 124 to transition back to the NORMAL state 210. During this exit process, the external clock to the memory can be on or off, and the memory output is held at 0. In addition, the memory core 124 is required to remain in the STAND-BY2 state 260 for at least one clock cycle. The time taken to go from the PM-RETAIN state 250 to the NORMAL state 210 is referred to herein as "exit latency," symbolized in FIG. 2 by a right-hand brace 280. Using the same assumptions for entry, the minimum exit latency is four functional clock cycles.

The third power management mode is the power down mode. In this mode, the internal clock is turned off to eliminate dynamic power consumption. In addition, the contents of the memory core 124 are not guaranteed to be retained when it comes out of the power down mode. Therefore, the power supply to the cells can be turned off, and all leakage currents in the memory core 124 are eliminated. The power down mode does, however, guarantee that for memories equipped with BISR the repair solution is retained, and the memory is functional once it comes out of the power down mode. The memory power consumption in the power down mode is the lowest.

Figure 3:
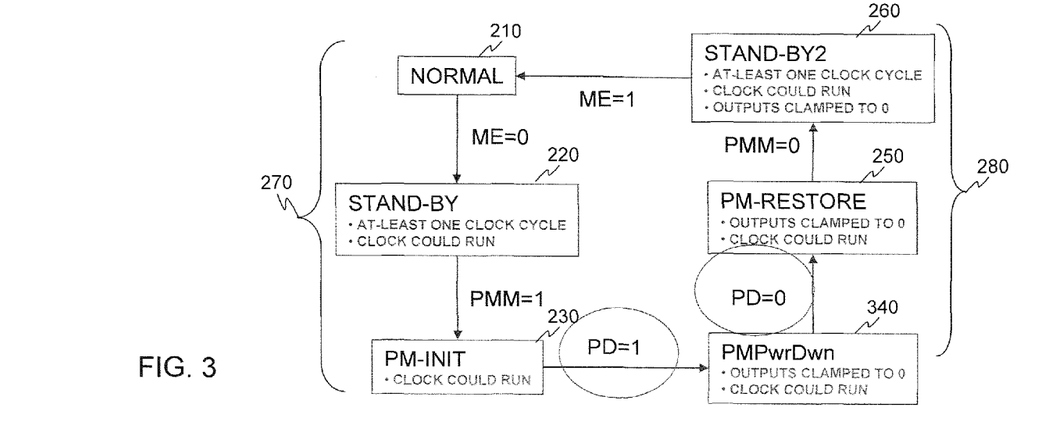
FIG. 3 is a state diagram describing states achieved and transitions encountered in entering and exiting one embodiment of a power down mode of the memory core of FIG. 1B.

FIG. 3 is a state diagram describing states achieved and transitions encountered in entering and exiting one embodiment of a power down mode of the memory core of FIG. 1B. Analogous to the retention mode, the sequence of power management pin settings that the user needs to follow to enter and exit the power down mode is well defined. The only difference is in the use of the PD pin instead of the RET pin. As a result, a PMPwrDwn state 340 replaces the PM-RETAIN state 240 of FIG. 2. The memory core 124 can remain in the PMPwrDwn state 340 indefinitely.

In the following discussion, it is assumed that the memory core and BISR logic are taken into account while designing the power management modes. However, depending on what type of built-in self-test (BIST) logic may be provided, it could continue to drain power in the retention and power down modes.

3. Power Management Mode Testing Issues

Next, What constitutes a sufficient test of memory management modes should be defined. In brief, a sufficient test is deemed to be a parametric test in which the specifications outlined in FIGS. 2 and 3 are tested for each memory core in the memory.

To test against these specifications fully, each memory core instance is made to enter and exit from the power management modes (into and out of PM-RETAIN and PMPwrDwn). Two passes of the transitions to enter into and exit out of PM-RETAIN, PMPwrDwn should be made: one with the external clock to the memory turned on and one without the external clock to the memory turned on.

While in the PM-RETAIN or PMPwrDwn modes, and while exiting from these states, the output of the memory core should be checked to ensure that it remains set to 0.

Finally, the entry and exit latencies should be as small as possible. It is preferable that each of the entry and exit latencies totals only four functional clock cycles. A different clock exists for each clock domain, and the functional clock above is assumed to be the clock for that domain. For example, to test a memory core instance in a 500 MHz clock domain, the shortest entry (or exit) latency during functional mode is 8 ns. If an external test clock of 100 MHz is used to enter and exit from the power management mode using four or more clock cycles, the entry and exit latencies are at least 40 ns each. Consequently, even if the memory core passes the test, it cannot be guaranteed to operate correctly in the functional mode. This test should therefore be considered inadequate.

Unlike a quantitative measure such as fault coverage, alternatives embodiments of testing power management modes should be evaluated qualitatively to ensure they adequately meet the above-described criteria for testing the power management modes. Two different testing embodiments will now be described and evaluated.

4. TAP-Based Testing

Figure 4:
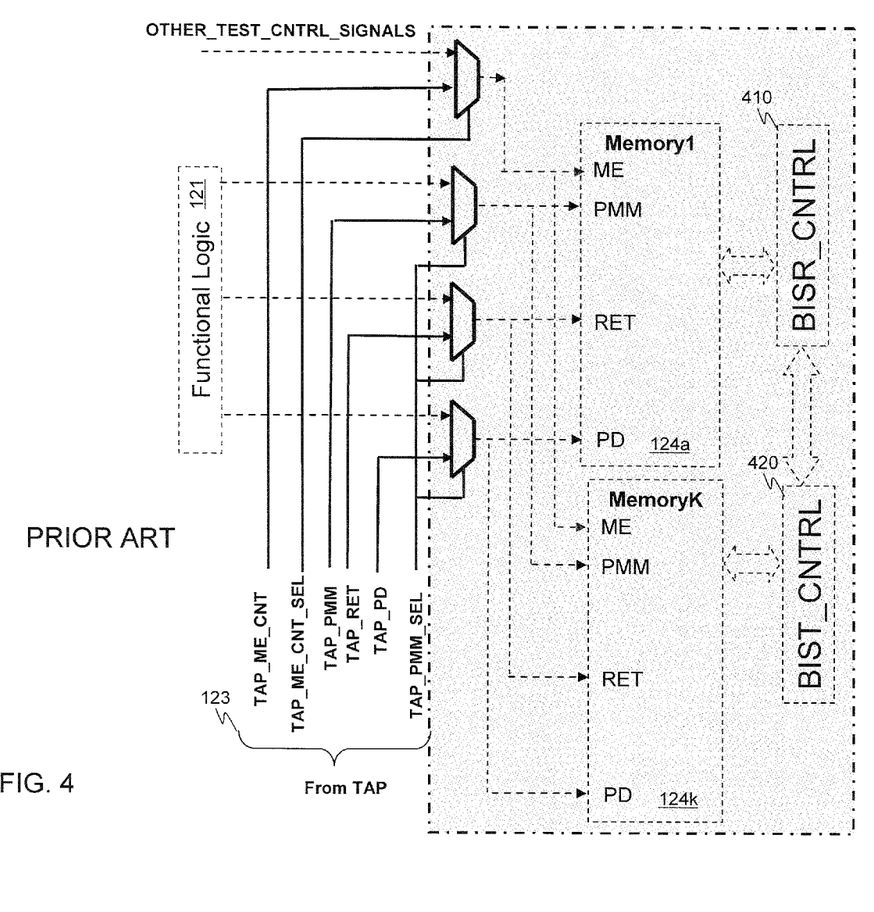
FIG. 4 is a diagram of a typical prior art technique for testing memory in an IC using a TAP.

The first embodiment is a TAP-based test. FIG. 4 is a diagram of a typical prior art technique for testing memory in an IC using a TAP. Any TAP-based test needs to have access to the power management pins during testing. To effect this, multiplexers (not referenced) are added to ME, PMM, RET and PD as shown in FIG. 4. In addition, a number of signals (TAP_ME_CNT, TAP_ME_CNT_SEL, TAP_PMM, TAP_RET, TAP_PD and TAP_PMM_SEL) driven from the TAP are added.

In FIG. 4, the shaded region designates a memory assembly. The particular memory assembly of FIG. 4 includes at least two memory cores 122a, . . . , 122k. It also has a BISR controller 410 and a BIST controller 420. Four multiplexers (not referenced) are included with each memory assembly. All the memory cores 122a, . . . , 122k within a memory assembly are put in one of the memory power management modes concurrently. The two select signals drive the select lines of the multiplexers as FIG. 4 shows.

Globally, one TAP_ME_CNT signal could be provided for each memory assembly in an IC, one TAP_ME_CNT signal could be provided for each of multiple subsets of memory assemblies, or one TAP_ME_CNT signal could be shared by all of the memory assemblies. In the first case, memory cores belonging to a memory assembly may be powered down one assembly at a time. In the second case, memory cores belonging to a particular subset of memory assemblies may be powered down one subset at a time. In the third case all memory cores in the IC are powered down simultaneously. In the first and second cases, depending on the number of memory assemblies or subsets, the size of the TAP registers could increase drastically. Given that testing a memory assembly takes some time, if one memory assembly is powered down at a time, the total test time could be protracted. In the following discussion it is assumed that all memory assemblies share one TAP_ME_CNT signal, although the concept is valid for other cases.

The following TAP instructions are assumed to be available to provide an ordered signal-setting sequence that sets values of signals as follows:

TAPINST_ME=1 (TAP_ME_CNT=1, TAP_ME_CNT_SEL=1, TAP_PMM_SEL=1, TAP_PMM=0, TAP_PD=0, TAP_RET=0);
TAPINST_ME=0 (TAP_ME_CNT=0, TAP_ME_CNT_SEL=1, TAP_PMM_SEL=1, TAP_PMM=0, TAP_PD=0, TAP_RET=0);
TAPINST_PMM=0 (TAP_ME_CNT=0, TAP_ME_CNT_SEL=1, TAP_PMM=0, TAP_PMM_SEL=1, TAP_PD=0, TAP_RET=0);
TAPINST_PMM=1 (TAP_ME_CNT=0, TAP_ME_CNT_SEL=1, TAP_PMM=1, TAP_PMM_SEL=1, TAP_PD=0, TAP_RET=0);
TAPINST_RET=0 (TAP_ME_CNT=0, TAP_ME_CNT_SEL=1, TAP_PMM=1, TAP_PMM_SEL=1, TAP_PD=0, TAP_RET=0);
TAPINST_RET=1 (TAP_ME_CNT=0, TAP_ME_CNT_SEL=1, TAP_PMM=1, TAP_PMM_SEL=1, TAP_PD=0, TAP_RET=1);
TAPINST_PD=0 (TAP_ME_CNT=0, TAP_ME_CNT_SEL=1, TAP_PMM=1, TAP_PMM_SEL=1, TAP_PD=0, TAP_RET=0); and
TAPINST_PD=1 (TAP_ME_CNT=0, TAP_ME_CNT_SEL=1, TAP_PMM=1, TAP_PMM_SEL=1, TAP_PD=1, TAP_RET=0).

The above set of TAP instructions may be used to derive a test for the power management modes. Table 1, below, shows one embodiment of a TAP-based test for the retention mode.

TABLE 1

TAP-Based Test Embodiment for the Retention Mode

| | |
|---|---|
| NORMAL | BIST (start-pause) |
| | MEM CLK OFF |
| | TAPINST_ME = 0 |
| STAND-BY | TAPINST_PMM = 1 |
| PM-INIT | TAPINST_RET = 1 |
| PM-RETAIN | Measure Power |
| | TAPINST_RET = 0 |
| PM-RESTORE | TAPINST_PMM = 0 |
| STAND-BY2 | TAPINST_ME = 1 |
| NORMAL | BIST (pause-pause) |
| NORMAL | BIST (pause-end) |

It is assumed that the BIST controller 410 is able to partition the BIST sequence into three phases. Per Table 1, a start-pause phase of the BIST run is first initiated. After that, the external clock to the memory is turned off, and TAPINST_ME is set to 0, causing the memory to make a transition to the STAND-BY state. Next, setting TAPINST_PMM to 1 causes the memory to make a transition to the PM-INIT state. Next TAPINST_RET=1 forces the memory to transition to the PM-RETAIN state. The memory is kept in the PM-RETAIN state for a predetermined period of time. Power measurements are then made in the PM-RETAIN state. After that time has elapsed, the PM-RETAIN state is exited by setting TAPINST_RET to 0, TAPINST_PMM to 0 and TAPINST_ME to 1, in that order, as Table 1 shows. Note that the BIST run should be divided into at least two phases, since the BIST passes the memory only if the state it has after the start-pause phase is retained after exiting the PM-RETAIN state.

Table 2, below, shows one embodiment of a TAP-based test for the power down mode.

TABLE 2

TAP-Based Test Embodiment for the Power Down Mode

| | |
|---|---|
| NORMAL | TAPINST_ME = 0 |
| | MEM CLK OFF |
| STAND-BY | TAPINST_PMM = 1 |
| PM-INIT | TAPINST_PD = 1 |
| PMPwrDwn | Measure power |
| | TAPINST_PD = 0 |
| PM-RESTORE | TAPINST_PMM = 0 |
| STAND-BY2 | TAPINST_ME = 1 |
| NORMAL | BIST |

It is assumed that the memory has been tested to be good and is initially in the NORMAL state. The memory is then driven to the PMPwrDwn state using the sequence of TAPINST_ME=0, TAPINST_PMM=1 and TAPINST_PD=1. The memory is then kept in the PMPwrDwn state for a predetermined amount of time, during which power measurements are made.

After the predetermined time has elapsed the memory is brought back to the NORMAL state through a sequence of TAP instructions TAPINST_PD=0, TAPINST_PMM=0 and TAPINST_ME=1. Once in the NORMAL state, memory BIST is run to determine if the memory if fully functional. For the power down mode, the BIST run does not need to be divided into two phases.

The TAP-based test will now be qualitatively evaluated based on the criteria discussed above in Section 3.

The criteria require two passes of the entry, retain (or power down) and exit process, once with MEM_CLK turned on and once with MEM_CLK turned off. The TAP-based test makes only one pass with MEM_CLK off.

The TAP-based test does not check if the output of the memory is set to 0 during the transition into and out of these modes.

The entry and exit latency of the TAP-based test is prohibitively high. Using the example of a memory in a 500 MHz clock domain, the entry and exit latencies of four clock cycles each imply entry and exit latencies of 8 ns each. If it is assumed that TCK is a 100 MHz clock, the clock cycle time is 10 ns. Even for a simple design, the number of bits that needs to be loaded into the TAP for each instruction will greatly exceed 50 bits. Using three such instructions to get into and out of the PM-RET state leads to an entry and exit latency much longer than 2 μs. This is considerably larger than the 8 ns latency required. For clock domains with higher clock frequency this discrepancy will be much higher.

The first two shortcomings can be rectified by modifying the TAP-based test described above. However, the third drawback cannot be eliminated.

In addition to the above shortcomings, six additional TAP signals have to be routed to all the memory assemblies. If the number of assemblies is small and physically located near each other and the TAP, this may not pose a problem. On the other hand, a large number of dispersed memory assemblies will add significantly to routing congestion. Section 5, below, introduces an alternative embodiment that addresses the above issues.

5. BIST Embodiments with Preset Measurement Time

The first alternate test assumes that the time that the memory needs to be in the PM-RETAIN and PMPwrDwn sates are known. For the purposes of discussion, that time is assumed to be 500 ms, but the test does not depend on this value.

To address the routing congestion issue encountered by the TAP-based test, only two TAP signals (TAP_PMM, TAP_RET_PD) are routed to all of the memory assemblies. As in the TAP-based testing, it is assumed that all assemblies in a clock domain are placed in the power management modes simultaneously and power measurements made. However, if individual memory assemblies are to be tested serially, independent TAP_PMM signals for the individual memory assemblies are required.

Figure 5:
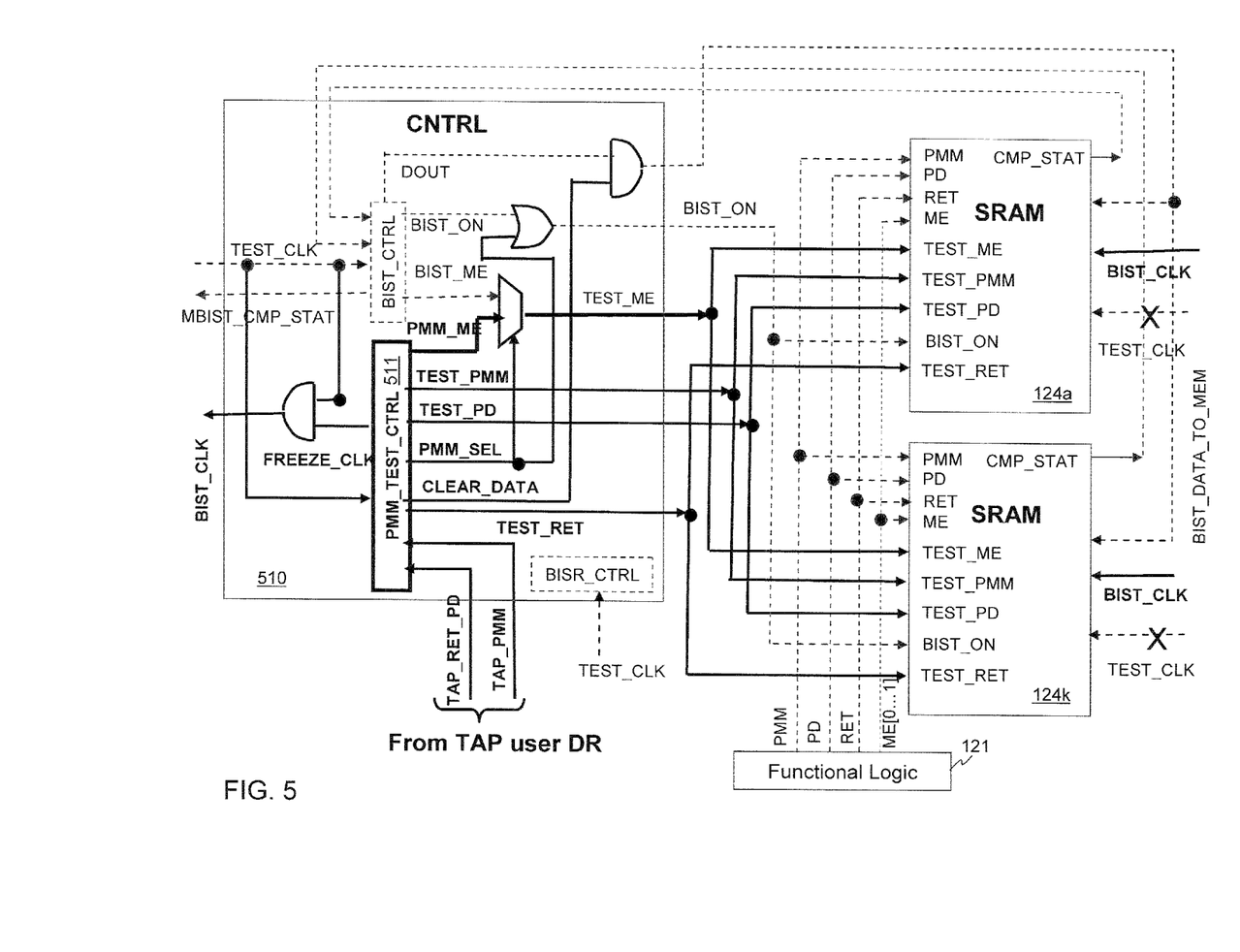
FIG. 5 is a diagram of one embodiment of a system for testing memory power management modes in an IC constructed according to the principles of the invention and employing one embodiment of a memory controller.

FIG. 5 is a diagram of one embodiment of a system for testing memory power management modes in an IC constructed according to the principles of the invention and employing one embodiment of a memory controller 510. As FIG. 5 shows, some modifications are made to the memory controller 510. It is assumed that the memory assembly has one or more memory cores (e.g., the memory cores 122a, ..., 122k), denoted in FIG. 5 as "SRAM" and FIGS. 6 and 10 as "SRAM_CORE." Each memory core 122a, ..., 122k includes a collection of multiplexers (not referenced) to select between the functional mode address/data bus versus the BIST mode address/data bus, select the functional clock versus the BIST clock and bypass multiplexers for use during scan testing. In addition, registers (not referenced) are present to capture the result of comparisons of the memory output with expected data. If the comparison fails, CMP_STAT is set to 0. Each memory assembly has a controller (CNTRL) which has a BIST controller (BIST_CNTRL) and, in the case of repairable memories, a BISR controller (BISR_CNTRL). Some relevant interconnect lines between these modules are shown in broken line. The CMP_STAT lines from all the memory cores are ANDed in the BIST_CTRL into the MBIST_CMP_STAT pin for an assembly.

To improve the testing of power management modes, the memory controller 510 is enhanced with the addition of a power management mode test controller, PMM_TEST_CTRL, 511 and a few unreferenced gates. FIG. 5 shows PMM_TEST_CTRL 511 and the gates and interconnect lines in bold lines. The memory controller 510 will now be described.

Figure 6:
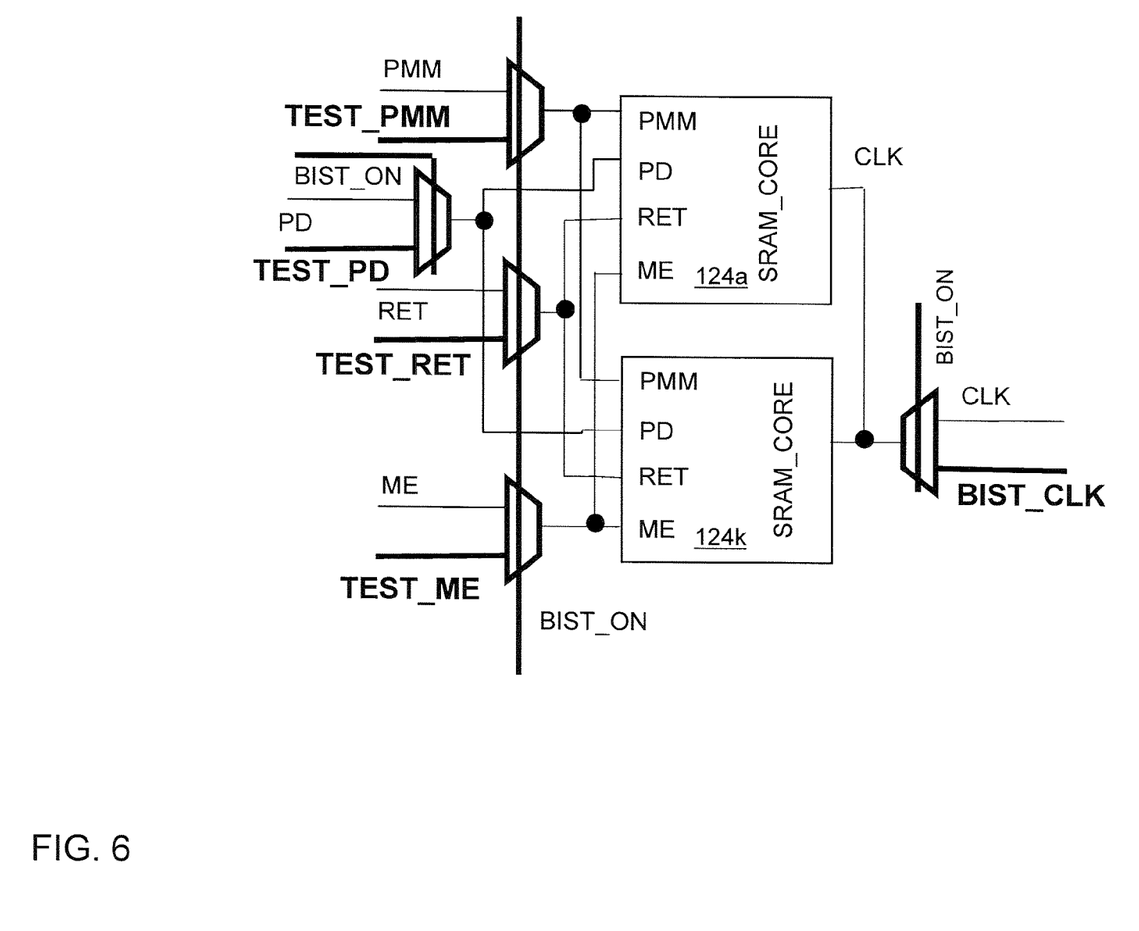
FIG. 6 is a diagram of multiplexers, employable with the memory controller of FIG. 5, to select between functional and test modes.

To gain control of the power management pins of the memory core during test, PMM_TEST_CTRL 511 generates the TEST_PMM, TEST_RET, TEST_ME and TEST_PD signals. Multiplexers (unreferenced) are used to select between the functional mode and test mode versions of the power management pins. FIG. 6 is a diagram of multiplexers, employable with the memory controller of FIG. 5, to select between functional and test modes. The BIST_ON signal drives the select lines of the multiplexers.

FIG. 6 shows these multiplexers to be shared by all the memory cores 122a, ..., 122k. Sharing of these multiplexers also saves routing area, since one set of power management signals, instead of pairs of power management signals, are routed to the memory cores 122a, ..., 122k which belong to an assembly and are geographically dispersed. Note that the addition of power management pins has an impact on the extent of PMM_TEST_CTRL 511 sharing.

In addition to the power management signals, a number of other signals are modified by the PMM_TEST_CNTRL 511. TEST_ME is either turned on by BIST_CNTRL or PMM_TEST_CNTRL using a multiplexer. PMM_ME and PMM_SEL signals generated by the PMM_TEST_CTRL 511 are set to 1/0 (when ME has to be driven to the 1/0 state) and 1 respectively during the power management test. For all other states PMM_SEL is 0 and TEST_ME is driven by BIST_ME. The BIST_ON signal generated by BIST_CTRL is modified by PMM_SEL.

To use CMP_STAT to determine whether or not the output of the memory is clamped at 0 during the power management modes, the power management mode test controller sets the CLEAR_DATA signal to 0, clearing the expected data provided by BIST_CTRL.

The power management mode test controller needs the ability to turn off the TEST_CLK during power management testing. For that the TEST_CLK signal is qualified with the FREEZE_CLK signal. In addition, instead of driving the memory cores with TEST_CLK, they are driven by BIST_CLK. FREEZE_CLK is 1 at all times except when PMM_SEL is on and a need exists to turn off the clock.

Figure 7:
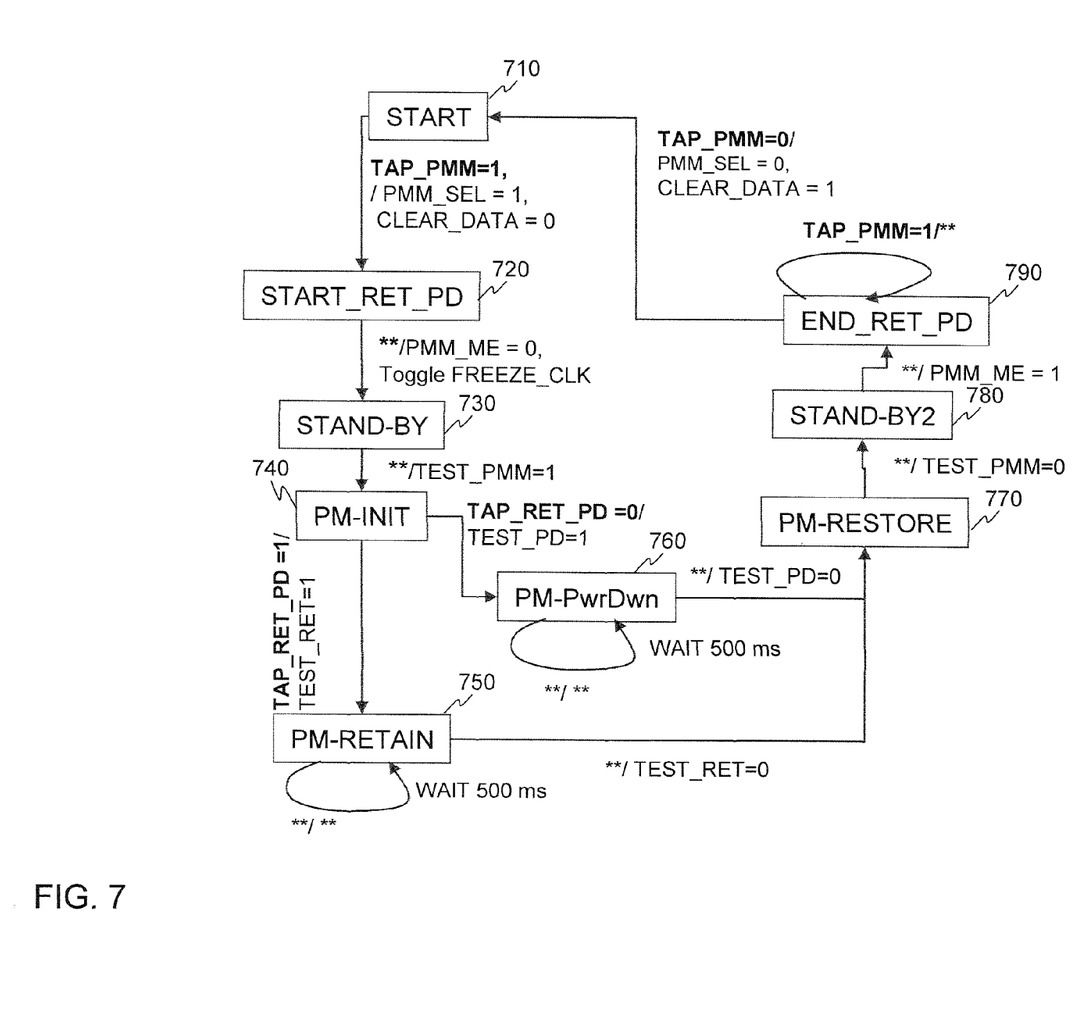
FIG. 7 is a state diagram describing states achieved and transitions encountered in one embodiment of a power management mode test controller, contained in the memory controller of FIG. 5, that uses a preset measurement time to test the modes.

FIG. 7 is a state diagram describing states achieved and transitions encountered in one embodiment of the power management mode test controller. The power management mode test controller uses a preset measurement time to test the memory power management modes. Note that the states in FIG. 7 replicate the states of the power management modes described in FIGS. 2 and 3. The labels on the arcs in FIG. 7 are of the form a/b where a is the value of the inputs to the power management mode test controller (TAP_PMM, TAP_RET_PD). "" signifies a "don't care" condition, and the transition occurs in the next clock cycle irrespective of the values of the two inputs. b specifies the output signals of the power management mode test controller (PMM_TEST, PMM_RET, PMM_PD, PMM_SEL, FREEZE_CLK, and CLEAR_DATA) that are modified. All other signals are assumed to retain their previous values. "" signifies that none of the outputs is changing. The label 500 ms specifies that the state is retained for 500 ms, during which time inputs are ignored, and no outputs are modified.

MBIST_CMP_STAT from all the memory assemblies is assumed to be combined into one I/O pin called CHIP_CMP_STAT. Since the number of clock cycles to enter one of the power management modes after the first TAP instruction was loaded is fixed, the exact number of clock cycles after which CHIP_CMP_STAT reflects the result of the comparison may be determined. The tester (110 of FIG. 1A) can therefore monitor this pin to determine if the output of the memory cores is clamped at 0 or not.

The power management mode test controller is in a START state 710 when the power management mode testing is not being done, and the TAP holds TAP_PMM to 0. To initiate power management mode testing, TAP_PMM is set to 1 using two TAP instructions. If the retention mode is also to be tested, TAP_PMM_RD is also set to 1 (TAP instruction TAP-INST_PMM_RET). If the power down mode is to be tested, TAP_RET_PD is set to 0 (TAP instruction TAPINST_PMM_PD). In both cases, a state transition to a START_RET_PD state 720 occurs, and PM_SEL and CLEAR_DATA are set to 1 and 0, respectively.

Transitions occur autonomously over the next two clock cycles. In the first clock cycle, PMM_ME is set to 0 (i.e., ME=0), and FREEZE_CLK is toggled, causing a transition to a STAND-BY state 730. Two passes are then made. For example, if FREEZE_CLK is initially 0, it is set to 1 in the first pass, and BIST_CLK is thus turned on. FREEZE_CLK is toggled to 0 in the second pass, and BIST_CLK is thus turned off. In this manner, the criterion of testing the power management modes with and without the BIST_CLK on is satisfied. In the subsequent clock cycle, the power management mode test controller sets TEST_PMM to 1 (i.e., PMM=1). The power management mode test controller then makes a transition to a PM_INIT state 740.

In the PM_INIT state 740, the value of TAP_RET_PD is checked. If TAP_RET_PD is 1, TEST_RET is set to 1 (i.e., RET=1), causing the memory to transition to the PM-RE- TAIN state 750. If TAP_RET_PD is 0, TEST_PD is set to 1 (i.e., PD=1), causing the memory to transition to the PMP-wrDwn state 760. This completes the entry into the appropriate power management mode.

It is assumed that the same clock that drives BIST_CTRL, i.e., the TEST_CLK, prompts the transitions in FIG. 7. TEST_CLK is assumed to be derived from a phase-locked loop (PLL) for the corresponding clock domain, and the power management mode test controller runs at the functional speed, as is BIST_CTRL. Therefore, the entry latency is four functional clock cycles, which satisfies the minimum entry latency criterion.

Transitions again occur autonomously over the next few clock cycles. If in the PMPwrDwn state 760, a wait of 500 ms (i.e., an equivalent number of clock cycles) occurs, after which TEST_PD is set to 0 (i.e., PD=0), causing the memory to transition to a PM-RESTORE state 770. If in the PM-RETAIN state 750, TEST_RET is set to 0 (i.e., RET=0), causing the memory to transition to the PM-RESTORE state 770. In the next clock cycle, TEST_PMM is set to 0 (i.e., PMM=0), causing the memory to a transition to a STAND-BY2 state 780. In the next clock cycle, TEST_ME is set to 1 (i.e., ME=1), causing the memory to transition to the END_RET_PD state 790.

After loading the TAP instruction to initiate the power management mode, the next TAP instruction TAPINST_PMM is loaded, setting TAP_PMM to 0 (i.e., PMM=0). It is assumed that it takes more than one functional clock cycle to load a TAP instruction. Up to this point, the power management mode test controller ignored the value of TAP_PMM. When in the STAND-BY2 state 780, the power management mode test controller samples the value of TAP_PMM, which by now has been set to 1 (i.e., PMM=1). In the next clock cycle, the power management mode test controller sets CLEAR_DATA to 1, PMM_SEL to 0 and makes a transition to the START state 710. The power management mode test controller thus relinquishes control of the power management pins.

Table 3, below, describes the test that uses the power management mode test controller for testing the retention mode. As in Section 4, above, it is assumed that the BIST run can be broken down into phases. It is also assumed that the BIST run is divided into at least three phases. It is further assumed that FREEZE_CLK is 0 prior to executing this test. The test exhibits similar behavior if FREEZE_CLK is initially assumed to be 1.

TABLE 3

Test That Uses the Power Management Mode Test Controller to Test the Retention Mode 1. BIST (start-pause)
2. TAPINST_PMM_RET
   Assume initially, FREEZE_CLK = 0
   FREEZE_CLK is set to 1 after two clock cycles
3. The tester starts monitoring CHIP_CMP_STAT after three clock cycles
4. TAPINST_PMM
5. Wait M + 3 − T clock cycles
   While waiting measure current/power
   The tester stops monitoring CHIP_CMP_STAT after M + 2 − T clock cycles
6. BIST (pause-pause)
7. TAPINST_PMM_RET
   FREEZE_CLK is set to 0 after two clock cycles
8. The tester starts monitoring CHIP_CMP_STAT after three clock cycles TABLE 3-continued Test That Uses the Power Management Mode Test Controller to Test the Retention Mode 9. TAPINST_PMM
10. Wait M + 3 − T clock cycles
    The tester measures current/power
    The tester stops monitoring CHIP_CMP_STAT after M + 2 − T clock cycles
11. BIST (pause-end)

For purposes of the present discussion, the term "clock cycle" refers to the number of TEST_CLK clock cycles, and TEST_CLK is assumed to have the same frequency as the functional clock. T is defined as the number of clock cycles required to load a TAP instruction, and M is defined as the number of clock cycles that result in a 500 ms wait.

The total number of clock cycles required to traverse the states of FIG. 7 is M+6 after issuing TAPINST_PMM_RET. Since Step 3 of Table 3 requires three clock cycles, and loading TAPINST_PMM requires T clock cycles, ensuring that TEST_PMM_CTRL has gone through the complete sequence of transitions shown in FIG. 7 requires at least M+3-T clock cycles.

The relationship between T and M imposes a lower bound on the number of clock cycles that the power management mode test controller waits in the retention mode. TAP_PMM is monitored only when the END_RET_PD state is reached. Transitioning from the START_RET_PD state to the STAND-BY2 state requires a total of M+5 clock cycles. Given that TAPINST_PMM begins to load three clock cycles after issuing TAPINST_PMM_RET, T<M+5. It is assumed that this bound is satisfied.

Note that the test makes two passes through the state transition sequence of FIG. 7. During Pass I, from steps 2-5 FREEZE_CLK=1, i.e., BIST_CLK is on. During Pass II, from steps 7-10 FREEZE_CLK=0, i.e., BIST_CLK is off. Thus, the criterion for testing for the retention mode with and without the external clock turned on is satisfied.

Another assumption is that the result of the comparison encoded in MBIST_CMP_STAT propagates to the CHIP_CMP_STAT within the same clock cycle. However, several reasons exist as to why this may not be true. If the number of memory assemblies is large or multiple clock domains with widely varying frequencies exist, this criterion is difficult to meet.

For the purpose of testing no need exists to monitor the failure of the comparison on a clock-clock cycle-by-clock-clock cycle basis. The result of the comparison can be accumulated at-speed in a local register. After the test has concluded, the accumulated result is reflected in MBIST_CMP_STAT of individual assemblies and can be monitored at slow speed by the tester at the CHIP_CMP_STAT pin. Such an infrastructure is already available in commercially available memory BIST products; thus, one skilled in the pertinent art can modify Table 3 to take this into account. With this modification to the test, the power management mode test controller meets all the criteria set forth in Section 3, above.

The test for the power down mode is similar to the retention mode test and is shown in Table 4, below.

TABLE 4

Test That Uses the Power Management Mode Test
Controller to Test the Power Down Mode 1. TAPINST_PMM_PD
   Assume initially, FREEZE_CLK = 0
   FREEZE_CLK is set to 1 after two clock cycles
2. TAPINST_PMM
3. Wait M + 6 − T clock cycles
   The tester measures current/power
4. BIST
5. Wait a few clock cycles for the MBIST_CMP_STAT from the slowest path to propagate to CHIP_CMP_STAT
6. The tester checks the CHIP_CMP_STAT to be 1
7. TAPINST_PMM_PD
   FREEZE_CLK is set to 0 after two clock cycles
8. TAPINST_PMM
9. Wait M + 6 − T clock cycles
   The tester measures current/power
10. BIST
11. Wait a few clock cycles for the MBIST_CMP_STAT from the slowest path to propagate to CHIP_CMP_STAT
12. The tester checks the CHIP_CMP_STAT to be 1

As discussed above, CHIP_CMP_STAT is no longer being monitored on a clock-clock cycle-by-clock-clock cycle basis but instead at the end of the test in Step 11 of Table 4. Also, as in Table 4, the BIST run is not being divided into phases but instead running twice, once with BIST_CLK on and once with BIST_CLK off.

6. BIST Embodiments with Adjustable Measurement Time

The embodiments presented in the previous section assume a predetermined amount of time in the power management modes which has to be fixed during design time since the design of the power management mode test controller is based on this value. However, those skilled in the pertinent art may want to modify the duration during which the memory is in the power management modes. In addition, certain embodiments keep the memory in the two modes, retention and power down, for two different durations. The embodiments of Section 5 generally do not meet these requirements. However, the embodiment of FIG. 8 does allow for that flexibility.

Figure 8:
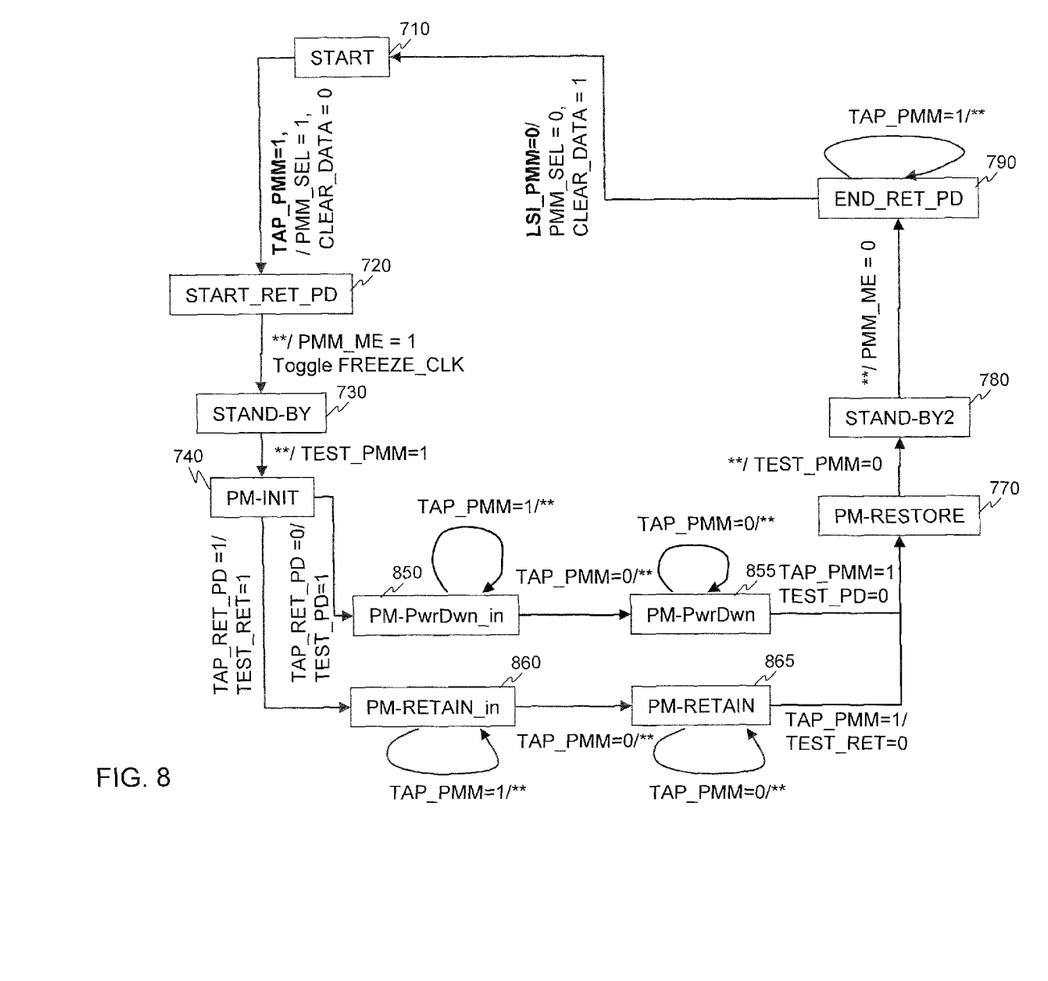
FIG. 8 is a state diagram describing states achieved and transitions encountered in one embodiment of a power management mode test controller, contained in the memory controller of FIG. 5, that uses an adjustable measurement time to test the modes.

FIG. 8 is a state diagram describing states achieved and transitions encountered in one embodiment of a power management mode test controller, contained in the memory controller of FIG. 5, that uses an adjustable measurement time to test the modes. As in Section 5, the two TAP-driven signals (TAP_PMM, TAP_RET_PD) and the modified memory assembly controller of FIGS. 5 and 6 are still used. However, the power management mode test controller itself is modified. FIG. 8 shows one embodiment of a modified power management mode test controller. There are two major differences between the power management mode test controller of FIG. 8 and that of FIGS. 5 and 6.

First, two states conform to each of the power management states: a PMPwrDwn_In state 850 and a PMPwrDwn state 855 for the power down mode and a PM_RETAIN_In state 860 and a PM_RETAIN state 865 for the retention mode. These pairs of states may be viewed as the entry into and out of the corresponding power management modes. The tester controls the amount of time these two states persist. This provides the flexibility of programming the time the memory remains in the power management mode after entry.

Second, in the power management mode test controller description of FIG. 7 values of TAP_PMM went through a 0→1→0 transition. This sequence of values on the TAP_PMM signal marked the start and end synchronizing points of TAP_PMM_CNTRL. TAP instructions set the values. In the TAP_PMM_CTRL description of FIG. 8, the TAP_PMM signal goes through a 0→1→0→1→0 transition.

The first 0→1 transition marks the initial synchronization point. The second 1→0 transition controls the transition from the PMPwrDwn_In state 850 to the PMPwrDwn state 855 (or the PM-RETAIN_In state 860 to the PM-RETAIN state 865). The next 0→1 transition controls the transition into the PM-RESTORE sate 870. The ability to program the separation between the last two 1→0 and 0→1 transitions provides the flexibility to determine the number of clock cycles that the memory resides in the power management modes. The final 1→0 transition is the last synchronizing point after which the power management mode test controller relinquishes control of the power management pins.

Table 5, below, describes one embodiment of a test for the retention mode.

TABLE 5

Test That Uses the Power Management Mode Test
Controller to Test the Retention Mode 1. BIST (start-pause)
2. TAPINST_PMM_RET
   Assume initially, FREEZE_CLK = 0
   FREEZE_CLK is set to 1 after two clock cycles
3. TAPINST_PMM = 0
4. Wait n clock cycles
5. TAPINST_PMM = 1
   The tester measures current/power
6. TAPINST_PMM = 0
7. BIST (pause-pause)
8. TAPINST_PMM_RET
   Assume initially, FREEZE_CLK = 0
   FREEZE_CLK is set to 1 after two clock cycles
9. TAPINST_PMM = 0
10. Wait n clock cycles
11. TAPINST_PMM = 1
    The tester measures current/power
12. TAPINST_PMM = 0
13. BIST (pause-end)
14. Wait a few clock cycles for the MBIST_CMP_STAT from the slowest path to propagate to CHIP_CMP_STAT
15. The tester checks the CHIP_CMP_STAT to be 1

TAPINST_PMM_RET is as defined in Section 5. Now, instead of having TAPINST_PMM which set TAP_PMM to 0, two TAP instructions TAPINST_PMM=0, TAPINST_PMM=1 are used. These TAP instructions set TAP_PMM to 0 and 1, respectively.

As in Section 5, if T is the number of clock cycles required to load a TAP instruction, the power management mode test controller is in the PMPwrDwn_In state 850 for T−3 clock cycles. In Step 10 of Table 5, n is the number of clock cycles the tester waits before loading the next TAP instruction that sets TAP_PMM to 1. Therefore, the power management mode test controller spends T+n clock cycles in the PMPwrDwn state 855. As a result, the memory remains in the power down state for a total of 2T−3+n clock cycles. Thus, by changing the value of n for the test, the total wait time can be modified in the power down mode. Note that this also means that a lower bound exists on the wait time in the retention mode which is given by 2T−3.

As discussed in Section 5, a limitation exists if CHIP_CMP-STAT is to be monitored in each clock cycle. Therefore, CHIP_CMP_STAT is monitored once after all steps in the test have completed.

The added flexibility of programming the wait time comes at a price in that the power management mode test controller spends T−2 clock cycles in the END_RET_PD state 790. Therefore, the embodiment of FIG. 8 does not satisfy the exit latency criterion of four clock cycles. However, its flexibility lends other advantages.

Table 6, below, describes one embodiment of a test for the power down mode.

TABLE 6

Test That Uses the Power Management Mode Test
Controller to Test the Power Down Mode

| | |
|---|---|
| 1. | TAPINST_PMM_RET |
| | Assume initially, FREEZE_CLK = 0 |
| | FREEZE_CLK is set to 1 after two clock cycles |
| 2. | TAPINST_PMM = 0 |
| 3. | Wait n clock cycles |
| 4. | TAPINST_PMM = 1 |
| | The tester measures current/power |
| 5. | TAPINST_PMM = 0 |
| 6. | TAPINST_PMM_RET |
| | Assume initially, FREEZE_CLK = 0 |
| | FREEZE_CLK is set to 1 after two clock cycles |
| 7. | TAPINST_PMM = 0 |
| 8. | Wait n clock cycles |
| 9. | TAPINST_PMM = 1 |
| | The tester measures current/power |
| 10. | TAPINST_PMM = 0 |
| 11. | BIST |
| 12. | Wait a few clock cycles for the MBIST_CMP_STAT from the slowest path to propagate to CHIP_CMP_STAT |
| 13. | The tester checks the CHIP_CMP_STAT to be 1 |

The test of Table 6 is similar to the test for the retention mode that Table 5 set forth above, with the same flexibility and limitation.

7. Enhanced BIST Embodiments for Diagnosis

Three different embodiments and variations thereof for testing memory power management modes have been illustrated and described above. In this section, modifications to those embodiments and variations that allow power management mode failures to be diagnosed will be illustrated and described. These embodiments can be used with both versions of the power management mode test controller described in Sections 5 and 6, above.

Two power management test failures could occur: (i) the power measurement, when in the retention and/or power down mode, is larger than the expected value and (ii) the output of one or more memories are not clamped to 0.

The first kind of failure is detected when the tester makes the power measurements, for example in Step 4 or Step 9 of Table 6, above. The goal is then to determine which one memory core or group of memory cores contribute to the elevated power consumption in the memory management modes.

The second kind of failure is detected in the last step of the test, for example in Step 13 of Table 6, above. In this case, the data bit in the memory core that has the error needs to be determined. Note that, unlike standard BIST memory failure, no need exists to identify the address location of the failure.

Figure 9:
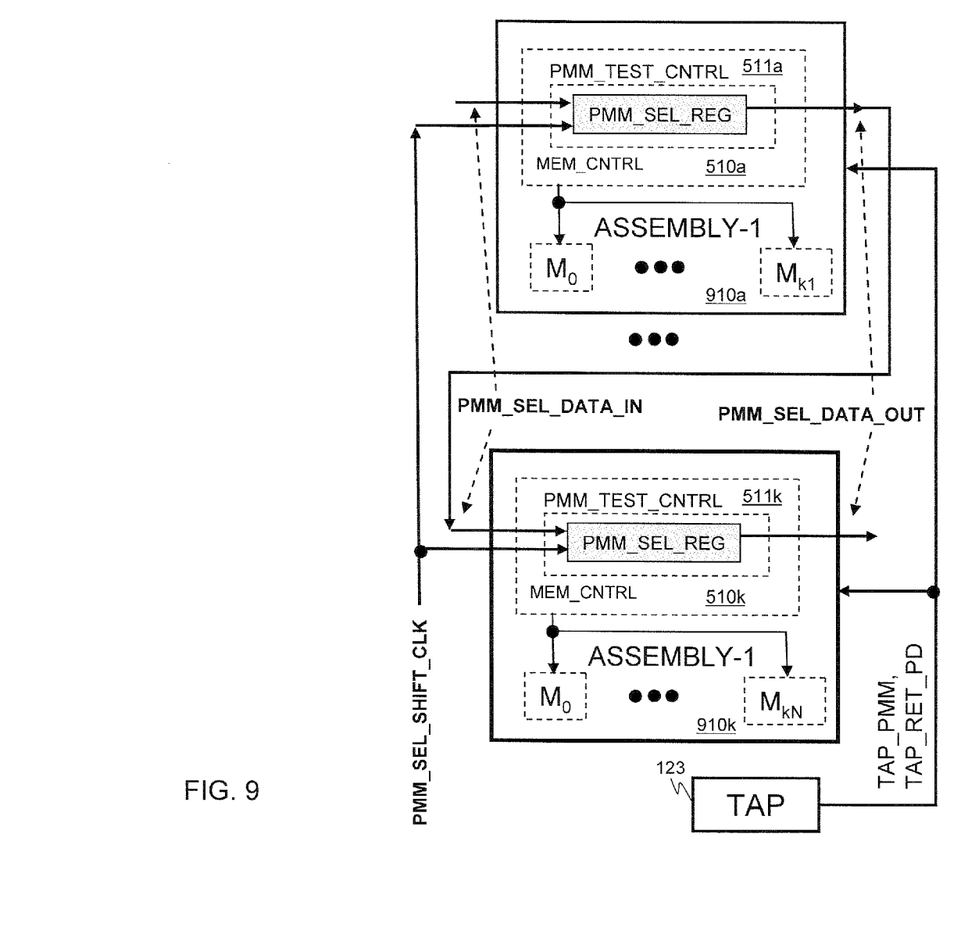
FIG. 9 is a diagram of a portion of an alternative embodiment of the memory controller of FIG. 5 configured to isolate a memory power management mode failure to a particular memory core.

FIG. 9 is a diagram of a portion of an alternative embodiment of the memory controller of FIG. 5 configured to isolate a memory power management mode failure to a particular memory core. Each instance of PMM_TEST_CTRL 511a, . . . , 511k is provided with a power management mode shift register PMM_SEL_REG. If k memory cores are in the memory assembly, PMM_SEL_REG has k bits, one for each memory core in the memory assembly. The power management mode shift registers of all memory assemblies 910a, . . . , 910k may be chained together into one long shift register chain. This power management mode shift register could be a relatively slow shift register driven by a relatively slow clock, denoted in FIG. 9 as PMM_SEL_SHIFT_CLK.

Figure 10:
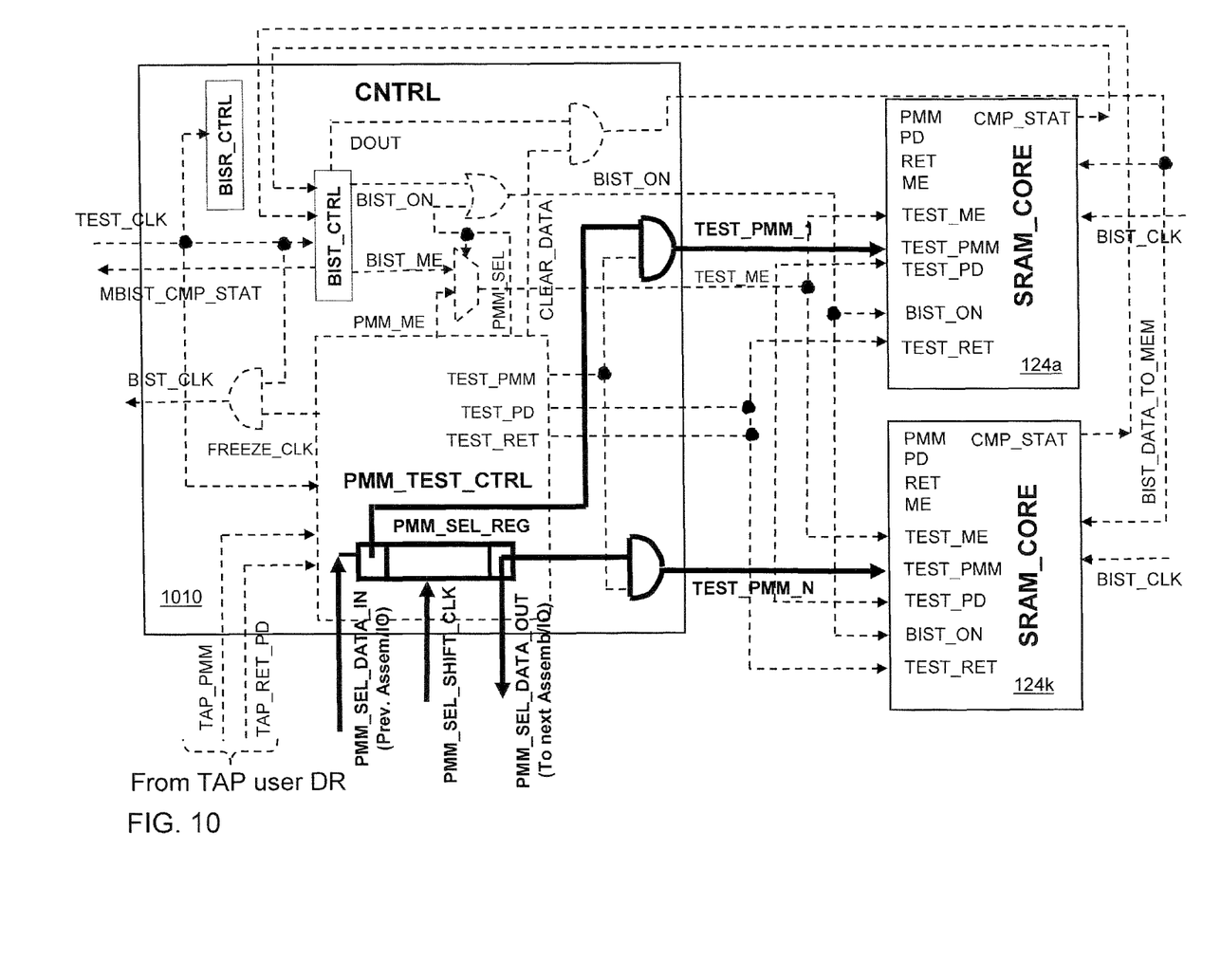
FIG. 10 is a diagram of the alternative embodiment of the memory controller of FIG. 5.

FIG. 10 is a diagram of the alternative embodiment 1010 of the memory controller of FIG. 5. The bits of the power management mode shift register are used to modify the TEST_PMM signal of the individual memory cores as shown in FIG. 10. To enable a particular memory core, the corresponding bit in the power management mode shift register is set to 1.

Before running retention or power down diagnostic tests, the power management mode shift register may be loaded with any combination of zeroes and ones to test any subset of the memory cores. One embodiment involves running these diagnostic tests multiple times to narrow the failures down to a group of assemblies and then diagnosing each assembly down to individual memory cores. However, the power dissipation in the individual memory cores may be so small that it falls within the noise margin of the background leakage current. In that case, the failure may only be able to be diagnosed to a memory assembly.

The second type of failure may be able to be diagnosed down to the memory cores using a similar strategy. If more diagnostic resolution is required, the same patterns can be run in conjunction with the diagnostic BIST patterns of the existing memory BIST infrastructure.

Figure 11:
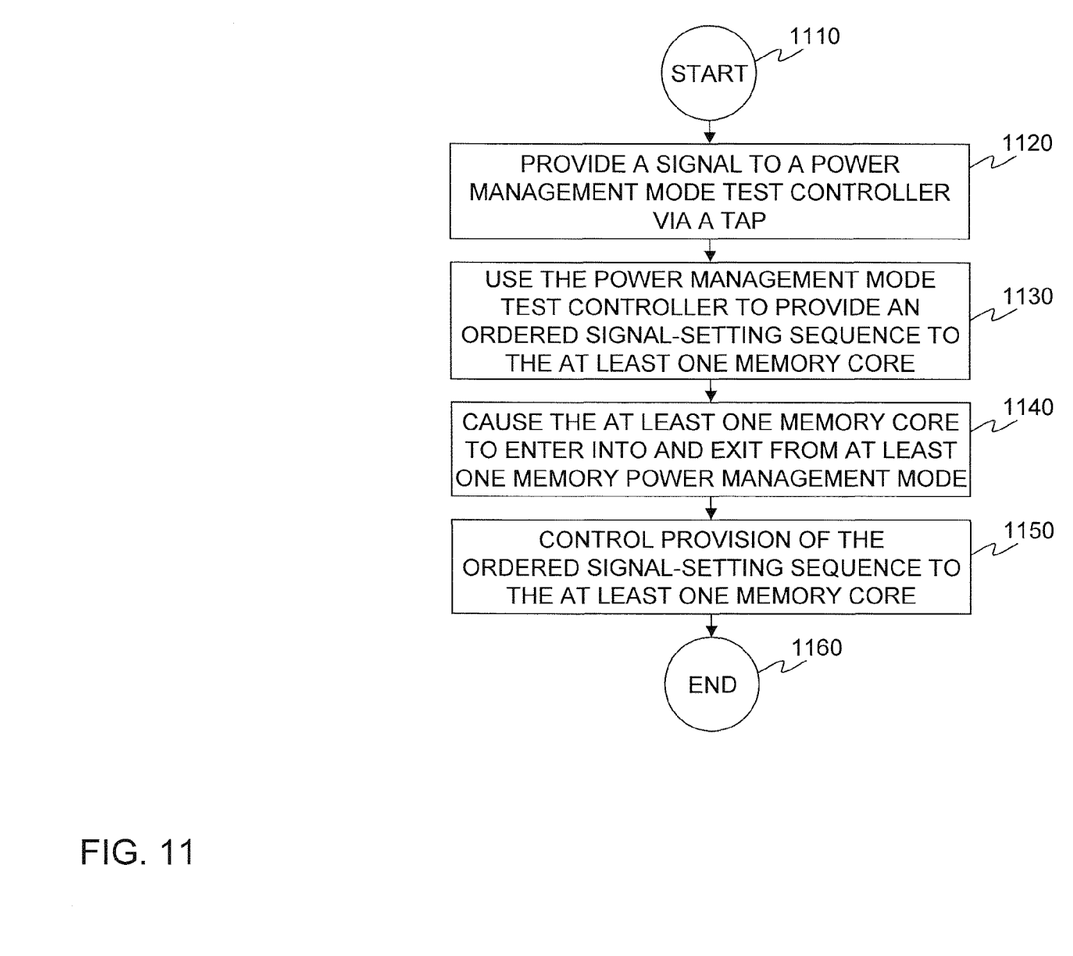
FIG. 11 is a flow diagram of one embodiment of a method of testing memory power management modes in an IC carried out according to the principles of the invention.

FIG. 11 is a flow diagram of one embodiment of a method of testing memory power management modes in an IC carried out according to the principles of the invention. The method begins in a start step 1110.

In a step 1120, a signal is provided to a power management mode test controller via a TAP. In a step 1130, the power management mode test controller provides an ordered signal-setting sequence to the at least one memory core. In a step 1140, the ordered signal-setting sequence causes the at least one memory core to enter into and exit from at least one memory power management mode. In a step 1150, provision of the ordered signal-setting sequence to the at least one memory core is controlled to limit the provision to fewer than all of the at least one memory core. The step 1150 is optional and for the purpose of conducting diagnostics to isolate a failure to a particular memory core, subset of memory cores or memory assembly, as desired. The method ends in an end step 1160.

Those skilled in the art to which the invention relates will appreciate that other and further additions, deletions, substitutions and modifications may be made to the described embodiments without departing from the scope of the invention.

What is claimed is:

1. A memory controller, comprising:
a power management mode test controller couplable to a test access port and at least one memory core and configured to respond to a signal provided via said test access port by operating independently of further input from said test access port to provide an ordered signal-setting sequence to said at least one memory core to cause said at least one memory core to enter into and exit from at least one memory power management mode.

2. The memory controller as recited in claim 1 wherein said ordered signal-setting sequence causes said at least one memory core to remain in said at least one memory power management mode for at most a single clock cycle of said power management mode test controller.

3. The memory controller as recited in claim 1 wherein said ordered signal-setting sequence causes said at least one memory core to remain in a predetermined power measurement state for a preset number of clock cycles of said power management mode test controller that is independent of said test access port.

4. The memory controller as recited in claim 1 wherein said ordered signal-setting sequence causes said at least one memory core to remain in a predetermined power measurement state for an adjustable number of clock cycles that is independent of said test access port.

5. The memory controller as recited in claim 1 wherein said at least one memory power management mode includes a power down mode.

6. The memory controller as recited in claim 1 wherein said at least one memory core is provided with memory enable, power management mode, retention and power down inputs.

7. The memory controller as recited in claim 1 wherein said power management mode test controller includes a power management mode shift register having a number of bits equaling a number of said at least one memory core and configured to control provision of said ordered signal-setting sequence to said at least one memory core.

8. A method of testing memory power management modes in an integrated circuit, comprising:
providing a signal to a power management mode test controller via a test access port; and
operate said power management mode test controller independently of further input from said test access port to provide an ordered signal-setting sequence to said at least one memory core to cause said at least one memory core to enter into and exit from at least one memory power management.

9. The method as recited in claim 8 wherein said ordered signal-setting sequence causes said at least one memory core to remain in said at least one memory power management mode for at most a single clock cycle of said power management mode test controller.

10. The method as recited in claim 8 wherein said ordered signal-setting sequence causes said at least one memory core to remain in a predetermined power measurement state for a preset number of clock cycles of said power management mode test controller.

11. The method as recited in claim 8 wherein said ordered signal-setting sequence causes said at least one memory core to remain in a predetermined power measurement state for an adjustable number of clock cycles of said power management mode test controller.

12. The method as recited in claim 8 wherein said at least one memory power management mode includes a power down mode.

13. The method as recited in claim 8 wherein said at least one memory core is provided with memory enable, power management mode, retention and power down inputs.

14. The method as recited in claim 8 wherein said power management mode test controller includes a power management mode shift register having a number of bits equaling a number of said at least one memory core and configured to control provision of said ordered signal-setting sequence to said at least one memory core.

15. An integrated circuit, comprising:
functional logic;
a test access port coupled to said functional logic; and
memory coupled to said functional logic and said test access port and including at least one memory core and a memory controller coupled thereto, said memory controller having:
a power management mode test controller configured to respond to a signal provided via said test access port by operating independently of further input from said test access port to provide an ordered signal-setting sequence to said at least one memory core to cause said at least one memory core to enter into and exit from at least a power down mode and a retention mode.

16. The integrated circuit as recited in claim 15 wherein said ordered signal-setting sequence causes said at least one memory core to remain in said at least one memory power management mode for at most a single clock cycle of said power management mode test controller.

17. The integrated circuit as recited in claim 15 wherein said ordered signal-setting sequence causes said at least one memory core to remain in a predetermined power measurement state for a preset number of clock cycles of said power management mode test controller.

18. The integrated circuit as recited in claim 15 wherein said ordered signal-setting sequence causes said at least one memory core to remain in a predetermined power measurement state for an adjustable number of clock cycles of said power management mode test controller.

19. The integrated circuit as recited in claim 15 wherein said at least one memory core is provided with memory enable, power management mode, retention and power down inputs.

20. The integrated circuit as recited in claim 15 wherein said power management mode test controller includes a power management mode shift register having a number of bits equaling a number of said at least one memory core and configured to control provision of said ordered signal-setting sequence to said at least one memory core.

21. A memory controller, comprising:
a power management mode test controller couplable to a test access port and at least one memory core and configured to respond to a signal provided via said test access port by providing an ordered signal-setting sequence to said at least one memory core to cause said at least one memory core to enter into and exit from at least one memory power management mode, including a retention mode configured to selectively disable a portion of said at least one memory core such that power consumed by said at least one memory core is reduced while retaining the contents thereof,
wherein said power management mode test controller includes a power management mode shift register having a number of bits equaling a number of said at least one memory core and configured to control provision of said ordered signal-setting sequence to said at least one memory core.

22. The memory controller as recited in claim 21, wherein said power management test controller is formed on an integrated circuit die that includes said at least one memory core.

23. A method of testing memory power management modes in an integrated circuit, comprising:
providing a signal to a power management mode test controller via a test access port; and
providing, with said power management mode test controller, an ordered signal-setting sequence to said at least one memory core to cause said at least one memory core to enter into and exit from at least one memory power management, including a retention mode configured to selectively disable a portion of said at least one memory core such that power consumed by said at least one memory core is reduced while retaining the contents thereof,
wherein said power management mode test controller includes a power management mode shift register having a number of bits equaling a number of said at least one memory core and configured to control provision of said ordered signal-setting sequence to said at least one memory core.

* * * * *